Figure 1:
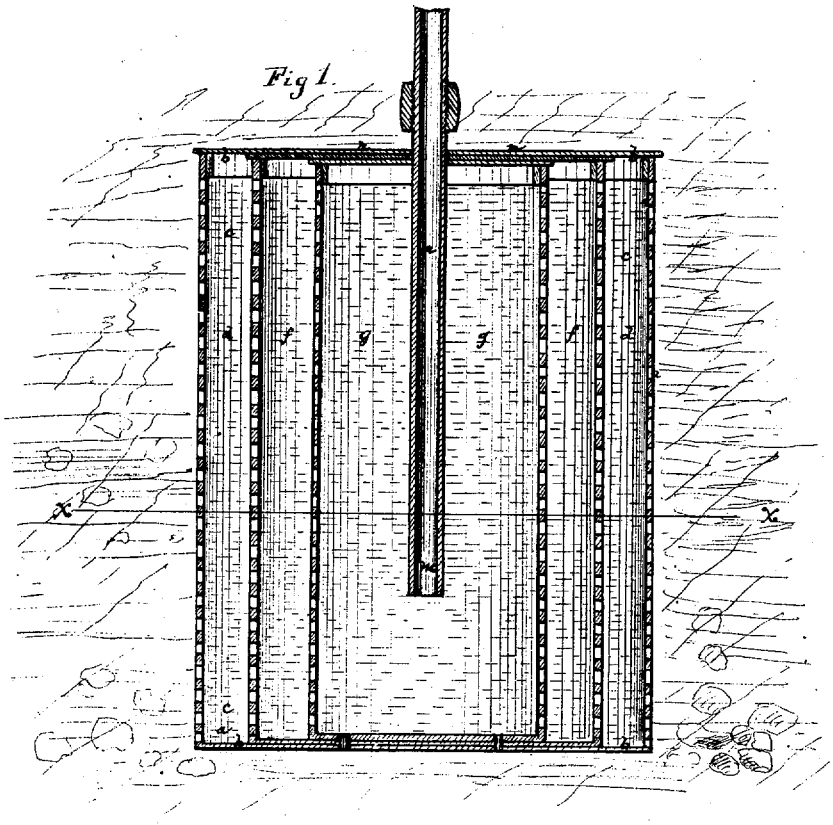

Dewey & Tillotson,

Cistern.

No. 4,165. Reissued Oct. 25. 1870.

Inventor.

R. H. Dewey
E. N. Tillotson
by Lewis L. Coburn
Atty

D. P. Lowl.
A. Moore

N. PETERS, PHOTO-LITHOGRAPHER, WASHINGTON, D. C.

United States Patent Office.

R. H. DEWEY AND ELIPHALET N. TILLOTSON, OF PITTSFIELD, MASSACHUSETTS, ASSIGNORS TO ELIPHALET N. TILLOTSON AND WILLIAM E. TILLOTSON.

Letters Patent No. 53,584, dated April 3, 1866; reissue No. 4,165, dated October 25, 1870.

DIVISION A.

IMPROVEMENT IN RESERVOIRS FOR WELLS.

The Schedule referred to in these Letters Patent and making part of the same.

*To all whom it may concern:*

Be it known that we, R. H. DEWEY and ELIPHALET N. TILLOTSON, of Pittsfield, in the county of Berkshire and State of Massachusets, have invented a new and improved "Reservoir for Wells;" and we do hereby declare that the following is a full, clear, and exact description thereof, which will enable others skilled in the art to make and use the same, reference being had to the accompanying drawing forming part of this specification.

In the sinking of wells in and below the surface of the ground, for obtaining water, much annoyance and trouble has heretofore been experienced from sand and other earthy or gritty substances getting into the pump used for raising the water to the surface of the ground, which oftentimes injure the pump to such a degree that, if a new one is not soon required, at least repairs are frequent, thus resulting in much expense and outlay, besides the annoyance and delay.

And, furthermore, the presence of such substances in the water is not agreeable to the taste when it is used for drinking purposes; and it is in many other respects extremely objectionable.

In order to keep the water in the well free from sand, &c., so as to obviate the liability of injury to the pump, &c., it is often necessary to clean the well of such debris, which is self-evidently disadvantageous, and causes much trouble and inconvenience.

Now, to obviate all these objections and defects in water-wells is the principal object of the present invention, and is, we think, successfully and satisfactorily accomplished thereby.

It consists in inserting within the bottom of the well a cylindrical receiver or vessel, closed at both of its ends, and with its sides perforated with a series of small apertures for forming communication between the inside and outside, so that the water surrounding such vessel, or contained in the stratum of earth in which it may be placed, can freely pass into the same, while, at the same time, the substance of sand, &c., and other debris, is entirely prevented, the inside of such vessel or receiver being divided into two or more separate compartments by concentric perforated partition-plates, in the outer one of which chambers may be placed charcoal, or other suitable filtering substances, for cleaning the water from all impurities, a pipe being connected with the inner chamber, having upon its upper end, above or near the surface of the ground, a suitable lifting-pump for raising the water contained in the same.

Having thus, in general terms, stated the object of the present invention, and the manner in which it is accomplished, we will now proceed to describe, in detail, its peculiar construction and arrangement, reference being had to the accompanying drawing, of which—

Figure 1 is a central vertical section, taken through the well-receiver or vessel.

Figure 2:
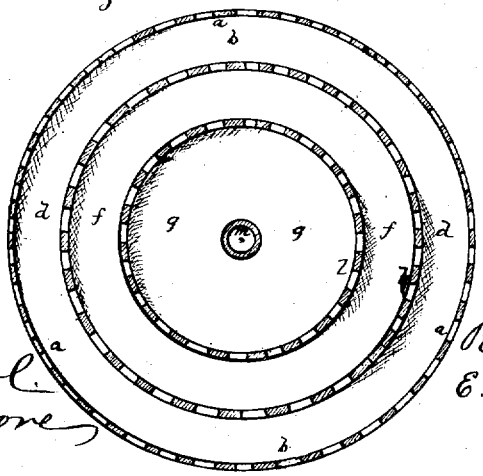

Figure 2, a horizontal transverse section, taken in the plane of the line *x x*, fig. 1.

*a a* in the drawing represents a cylindrical vessel, made of sheet-iron, tin, or other suitable metal, or material, closed at both of its ends *b b*, but with a series of perforations or apertures, *c c*, &c., upon and around its side, communicating with the interior thereof, which is divided into three separate and distinct chambers or compartments, *d*, *f*, and *g*, by two concentric perforated plates, *h* and *l*, placed one within and a short distance from each other and parallel to and extending in the same direction with the exterior side plates of the vessel.

*m*, a pipe or tube inserted in and passed through the top plate *n* of the vessel, through the center or inner chamber *g* of which it extends nearly to the bottom thereof, which pipe is to be of sufficient length to reach to the top of the well, or nearly so, when the receiver is placed therein, where a lifting-pump, of any suitable description, for raising water is secured.

Within the outer one, *d*, of the chambers we place coarse sand, and, in the intermediate one, charcoal, or other suitable filtrating substance or substances, so that as the water passes from the well or ground into the inner chamber of the receiver to the pump-pipe, it shall be cleansed of all impurities, thus preventing any possibility of sand, or other gritty substance, or debris reaching the pump and clogging its operation, as well as injuring all its parts, the importance and advantages of which result are obvious to all.

As has been before stated, this cylindrical vessel is placed in the bottom of the well, and it can be then entirely covered up to any depth, if so desired, with earth, the pipe forming the communication with its interior to withdraw the water which enters the same.

*Claim.*

We claim—

In its application as a buried water-reservoir, in the bottom of a well, the filter, consisting of a perforated cylinder or cylinders, the central space forming a chamber into which the water is filtered and from which the water-supply is drawn by an ordinary elevating device, as described.

R. H. DEWEY.
ELIPHALET N. TILLOTSON.

Witnesses to R. H. DEWEY'S signature:
JAMES M. BARKER,
W. E. TILLOTSON.

Witnesses of E. N. TILLOTSON'S signature:
LEWIS L. COBURN,
J. W. MUNDAY.